United States Patent [19]

Hidding

[11] 4,319,833
[45] Mar. 16, 1982

[54] ORIGINAL FEED SYSTEM FOR COPYING MACHINE

[75] Inventor: Gerhard Hidding, Venlo, Netherlands

[73] Assignee: Océ-Nederland B.V., Venlo, Netherlands

[21] Appl. No.: 156,689

[22] Filed: Jun. 5, 1980

[30] Foreign Application Priority Data

Jun. 27, 1979 [NL] Netherlands .......................... 7904987

[51] Int. Cl.³ .......................... G03B 27/32; B65H 5/00
[52] U.S. Cl. ........................................ 355/23; 271/3.1; 271/301
[58] Field of Search .................. 355/3 SH, 14 SH, 23, 355/24, 25; 271/3.1, 301

[56] References Cited

U.S. PATENT DOCUMENTS 4,140,387 2/1979 Gustason .............................. 271/3.1
4,158,500 6/1979 Di Francesco et al. .............. 271/3.1
4,264,067 4/1981 Adams et al. ..................... 355/3 SH

FOREIGN PATENT DOCUMENTS 2805674 8/1978 Fed. Rep. of Germany .

OTHER PUBLICATIONS

IBM Technical Disclosure Bulletin, *Duplex Document Feeder*, vol. 19, No. 12, May 1977, Authur-Bullock.

*Primary Examiner*—L. T. Hix
*Assistant Examiner*—Alan Mathews
*Attorney, Agent, or Firm*—Albert C. Johnston

[57] ABSTRACT

A system for feeding originals one by one from a stack of them to the illumination station of a copying machine and finally back to the top of the stack, so as to enable automatic production of sets of correctly sequenced copies of double-sided and/or single-sided originals, comprises a holder for stacking originals, means for removing the bottom original from the holder, a first transport path for transporting the original from the holder to the illumination station via its inlet side with the side of the original that faced downward in the holder in position for copying, means for transporting the original from the exit side of the illumination station into a reversing path and from the reversing path again via the inlet side to the illumination station, and means including at least part of the reversing path and a final transport path for returning the original from the exit side of the illumination station to the holder and placing it in its original orientation on top of the stack.

12 Claims, 4 Drawing Figures

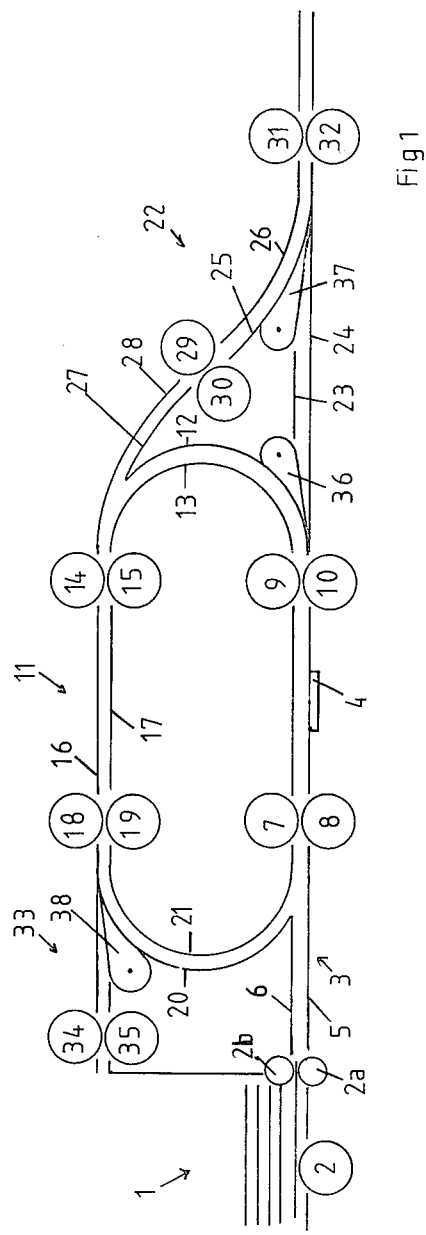
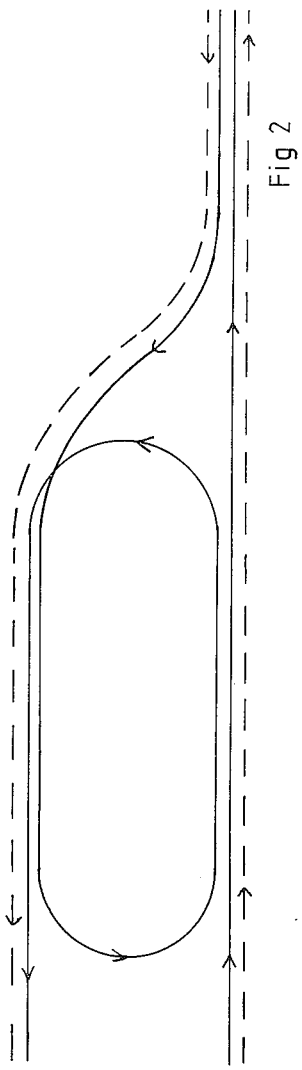

ORIGINAL FEED SYSTEM FOR COPYING MACHINE

The present invention relates to an apparatus or system for feeding originals for copying in a copying machine, by which multiple sets of correctly sequenced copies of double-sided and/or single-side originals can be obtained automatically.

An apparatus is known for assembly on a copying machine, by which originals that carry on both sides text to be copied can be copied automatically several times so as to produce multiple sets of copies arranged in proper sequence. For this purpose the originals are stacked in a certain sequence and are taken one by one from the bottom of the stack. Each original taken from the stack is transported past an illumination station to expose one of its sides, then is inverted and transported in the same direction past the illumination station to expose its other side, and then is again inverted and placed back in its original orientation on top of the stacked originals. When copying multi-sheet documents all sheets of the document are copied before a following set of copies of the sheets is produced. This manner of operation has the advantage that the copies are supplied in the correct sequence by the copying machine, without need for a sorter to collate them.

An apparatus of the type mentioned is disclosed in U.S. Pat. No. 4,140,387. In accordance with that disclosure, sheetlike originals are stacked in numerical order with the first page facing upward, and before commencement of the copying procedure a new stack is formed by removing the lowest sheet on each occasion, inverting this sheet and placing it on the new stack. As a result the page sequence in the second stack from top to bottom is 2, 1, 4, 3, 6, 5, etc. Copying of both sides of an original is carried out by removing the bottom sheet from the new stack, inverting the sheet, and first passing the sheet past an illumination station to expose the side that was faced upward in the new stack. The sheet then is again inverted and its direction of movement is reversed to convey it in a second transport operation past the illumination station, after which the sheet and its direction of movement are reversed yet again before the sheet is placed in the correct sequence on the second stack.

That known system has the disadvantage, inter alia, that a preparatory stage is required, comprising the removal of the originals one by one and laying them down in inverted position. Furthermore, extra structures are required in order to perform the second and third inversions during the copying procedure. This not only costs time but also involves extra sources of possible malfunction and imposes extra manipulations and wear on the originals.

With that known system, moreover, it is not always practicable to deal with single-sided originals while copying double-sided originals. During the double-sided copying of an odd number of single-sided originals, a first page is of course copied without a second page. Further, an even numbered page is always copied with a following odd numbered page on one sheet. This can be regarded as a shortcoming, because it is conventional practice to place an odd numbered page with the following even numbered page on one sheet. While another sequence for the originals should be selectable under such circumstances, in order to avoid oversights it is desirable to be able to process originals in all cases with the same sequence of the originals and the same position of the stack.

The principal object of the present invention is to provide an apparatus or system for feeding originals by which multiple sets of correctly sequenced copies of double-sided and/or single-sided originals can be produced automatically with avoidance of the above-mentioned disadvantages or shortcomings of the known system.

For this purpose, according to the invention, an apparatus or system is provided which comprises a holder for a stack or originals to be copied, means for removing the originals one by one from the bottom of the stack in the holder, an illumination station having an inlet side and an exit side, a sheet reversing path, a first transport path for transporting each original removed from the holder to the inlet side of the illumination station so as to copy first the side of the original that faced downward in the holder, means for transporting the original from the exit side of the illumination station to the reversing path and from the reversing path back to the inlet side of the illumination station for copying the other side of the original, and a final transport path for returning the original to the top of the stack holder.

The system of the invention has the advantage that the original is subjected to as few processing manipulations as possible and thus is subjected to minimum wear. Furthermore, regardless of whether single-sided or double-sided originals are to be copied, the stack of originals can always be placed in the holder with the first page facing downward. This stack position is preferred, although it is not essential, for copying double-sided originals.

According to a further feature of the invention, a direct transport connection is provided, in parallel relation to the sheet reversing path, between the means for transporting the original to and the means for transporting it from the reversing path, whereby a continuous path is formed between the inlet and exit sides of the illumination station. This arrangement offers the advantage that, whenever so desired, one side of a single original can be copied several times without need for conveying this original on each occasion via the stack holder.

The above-mentioned and other objects, features and advantages of the invention will be further evident from the following detailed description and the accompanying drawings of illustrative embodiments of the invention.

In the drawings:

FIG. 1 is a schematic sectional view of an apparatus for carrying out the invention;

FIG. 2 is a schematic view of the path followed by the originals in the use of the apparatus shown in FIG. 1;

Figure 3:
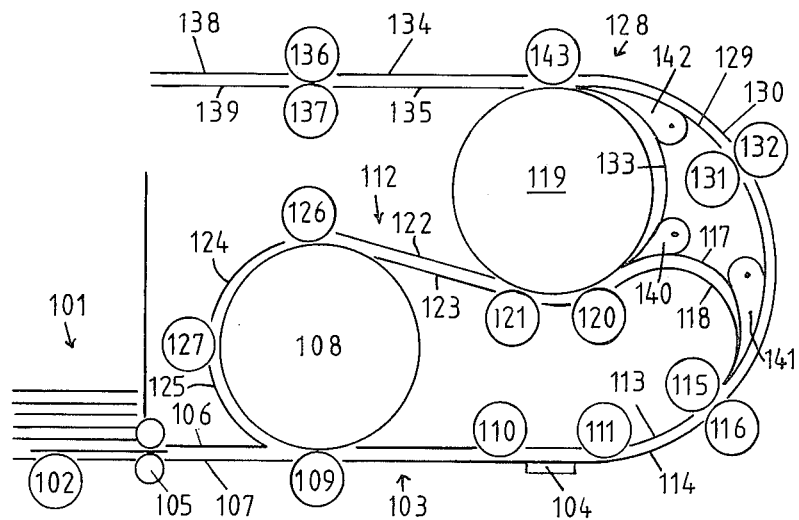
FIG. 3 is a schematic sectional view of another form of apparatus for carrying out the invention.

The apparatus shown schematically in FIG. 1 comprises a holder 1 for a stack of sheetlike originals to be copied. The holder has a sheet feed roller 2 in its base, and a straight first transport path 3 defined by a flat surface at 5 extends from a sheet separating device at the base of the holder to guide originals past an illumination station at 4. The sheet separating device comprises two rollers 2a and 2b located one above the other so that the lower roller can feed an original into the first transport path while the upper roller is rotated in the opposite direction to check an overlying original and prevent it from being co-conveyed. Viewed in the direction of transport, the straight transport path 3 is formed by a sequence of two parallel-fastened flat guide plates 5 and 6, a pair of coacting transport rollers 7 and 8, two flat guide plates with a recess in the lower of them for the illumination station 4, and a second pair of transport rollers 9 and 10.

A continuous transport path 11 has a portion thereof constituted by part of the first transport path, but curves away from the plane of the first transport path beyond the exit side of the illumination station, i.e., its side facing away from the holder 1, thus extending in loop fashion over the illumination station, and then merges into the first transport path once again at a location between the illumination station and the stack holder. The structures forming this continuous transport path comprise, in sequence, a set of semi-cylindrical curved guide plates 12 and 13, a pair of transport rollers 14 and 15, two parallel flat guide plates 16 and 17, a pair of transport rollers 18 and 19, and a second set of semi-cylindrical curved guide plates 20 and 21.

A sheet reversing path or device 22, shaped like a two-legged fork, is connected by both of its legs to the continuous path 11. The first leg of device 22 is formed by two parallel straight guide plates 23 and 24 arranged as an extension of the first transport path. The second leg is formed by two sets of slightly curved guide plates 25 and 26 and 27 and 28, with a pair of transport rollers 29 and 30 located between the sets of plates. The stem of the fork, which communicates with either of the legs, is provided with a pair of transport rollers 31 and 32 which can be reversed in their direction of rotation to reverse the direction of movement of a sheet engaged between them.

Between the continuous path 11 and the top of the holder 1 there is a second straight path 33, a final transport path, which extends as a branch from the continous path. The final transport path is formed by flat guide plates leading to and from a pair of transport rollers 34 and 35.

A switch 36 is mounted in the angle between the guide plates 12 and 23. A switch 37 is mounted in the angle between the guide plates 23 and 25, and a switch 38 in the angle between guide plate 20 and the branched transport path 33.

A stack of originals with the sheets arranged in the numerical order is placed in the holder 1 with the first page of the first sheet facing downward. By the action of feed roller 2 and the separating rollers 2a and 2b the bottom original is conveyed to the illumination station 4 via the straight first transport path 3. After passing the illumination station, the original passes underneath the switches 36 and 37, which have previously been lifted upwards, and is guided into the stem of the fork-shaped branch path 22 by the transport rollers 31 and 32. When most of the original has been moved past these rollers, the switch 37 is pivoted downward (into the position shown) and the direction of rotation of the rollers 31 and 32 is reversed. As a result the original is moved in the reverse direction past the upper side of the switch 37 and is conveyed from the fork-shaped branch path via its second or upper leg. The original then is further transported in the continuous path by the transport rollers pairs 14 and 15 and 18 and 19 and thus is moved past the third switch 38 which has previously been lifted upward (as it is shown in FIG. 1). In this position the switch 38 closes the entry to the branch transport path 33, so that the original is bent and passed downward between the curved guide plates 20 and 21 and then is returned to the illumination station 4 via the rollers 7 and 8. The original now passes the illumination station with its second side facing downward for exposure, and then it is turned upward by the switch 36 which in the meantime has been pivoted downward. Having thus been brought once again into the continuous path 11, the original now passes over the switch 38, which in the meantime has been pivoted downward, and by the transport rollers 34 and 35 the original is placed on top of the stack in the holder 1.

The route taken by the original when two sides of it are copied in the system of FIG. 1 is indicated by full lines in FIG. 2. The dashed lines in FIG. 2 indicate the route for an original when only one side needs to be copied. In the latter case the original follows the path between the guide plates and the pairs of transport rollers in the same way as a double-sided original up to the entrance of branch path 33, but here the third switch 38 is constantly maintained in its lower position so that the second conveyance past the illumination station is dispensed with and the original is passed via path 33 directly into the holder 1 from the upper side of the continuous path 11.

The system of FIG. 1 can also be employed for copying a single side of an original a number of times, by keeping the switch 36 in its lower position and the switch 38 in its upper position so that the original will be circulated repeatedly through the continuous path before being returned to the top of the stack 1 via the switch 38 and branch path 33.

The embodiment of the invention shown in FIG. 3 comprises a stack holder 101 having a transport roller 102 in its base, and a straight first transport path 103 extends along a flat plane, as an extension from the base of the holder, to an illumination station 104. Between the holder 101 and the straight first transport path 103 there is a sheet separating device 105 comprising two rollers located one above the other, the lower of which can feed the lowermost original of a stack in the holder into the first transport path while the upper roller by rotating in the opposite direction holds back an overlying original that otherwise might be co-conveyed at the same time. The transport path 103 is formed by two parallel plates 106 and 107 which are interrupted by openings that accommodate coacting transport rollers 108 and 109 and two transport rollers 110 and 111 located, respectively, directly ahead of and beyond the illumination station 104.

A continuous transport path 112 is constituted in part by part of the first transport path and, as viewed from roller 111 near the exit side of the illumination station, comprises in sequence an initial curved trajectory, a straight trajectory, and a second curved straight trajectory which merges near roller 109 into the straight first transport path. The initial curved trajectory is formed by two curved guide plates 113 and 114, a pair of transport rollers 115 and 116, two curved guide plates 117 and 118, and a portion of the surface of a large transport roller 119 which interacts with two smaller rollers 120 and 121. The straight trajectory comprises two parallel flat guide plates 122 and 123. The second curved trajectory is formed on the inner side by the surface of the transport roller 108 and on the outer side by semi-cylindrical curved guide plates 124 and 125 arranged with two transport rollers 126 and 127 which coact with the roller 108.

A reversing branch path 128 shaped like a two-legged fork is connected by both of its legs to the continuous path 112 at the ends of the curved guide plates 117 and 118. An outer leg of this branch path includes two curved guide plates 129 and 130 in which a pair of transport rollers 131 and 132 is located. The second or inner leg is formed by a portion of the surface of the large transport roller 119 and a curved guide plate 133 placed near this surface. The stem of the two-legged branch path is constituted by two parallel flat guide plates 134 and 135 which lie substantially parallel to and above the first transport path. A final transport path is provided as an extension of the guide plates 134 and 135, being formed by a pair of transport rollers 136 and 137 and two flat guide plates 138 and 139 which extend to a location near the top of the holder 101.

Switches 140 and 141 are mounted, respectively, at the junctions between the continuous path and the two legs of the reversing branch path. A third switch 142 is located in the angle between these legs at the upper side of the large roller 119. A roller 143 which coacts with the top of roller 119 is also provided near this angle.

A stack of originals with the sheets arranged in numerical order is placed in the holder 101 with the first page of the first sheet facing downward. By the action of the transport roller 102 and the separating rollers 105 the bottom original of the stack is fed to the illumination station 104 via the straight first transport path 103. After passing the illumination station the original is transported via the outer leg of the reversing path, the switches 141 and 142 then being located out of this leg (in the position shown). After the original has arrived in the stem of the branch path between the guide plates 134 and 135, switch 142 is pivoted upward and the direction of rotation of the pairs of transport rollers 119 and 143 and 136 and 137 is reversed. The original is now transported back in the reverse direction via the second leg of the reversing path, in which the switch 140 meanwhile has been pivoted downward. The original thus is passed into the continuous path 112 and from this to the illumination station 104 for copying the other side, or second page, of the original. The original then is passed to the top of the holder 101 and placed on the stack in the holder, being fed via the first (outer) leg of the reversing path, the switch 142 which has again been turned downward, the stem of the reversing path, and the guide plates 138 and 139.

Figure 4:
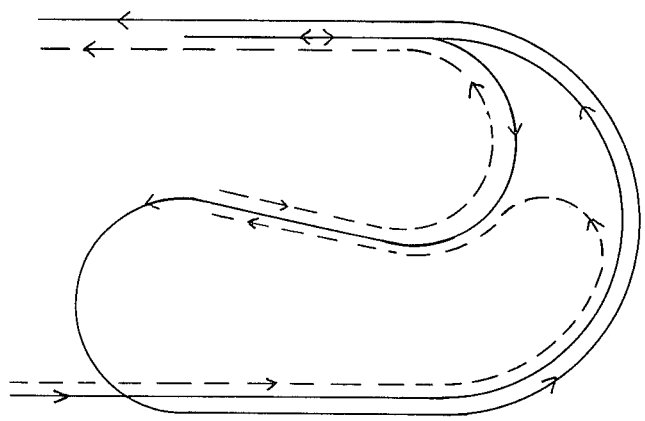
FIG. 4 is a schematic view of the path followed by the originals in the use of the apparatus shown in FIG. 3.

The route taken by the original when two sides of it are copied in the system of FIG. 3 is indicated by full lines in FIG. 4. The dashed lines in FIG. 4 indicate the route taken by an original when only one side needs to be copied, in which case the original is not passed through the outer leg of the reversing path and, instead, is transported between the guide plates 117 and 118 via the switch 141 which for this purpose has been turned outward. The original then passes the switch 140, which then is in the lifted position shown, after which this switch is turned downward and the direction of movement of the transport rollers 119, 120 and 121 is reversed. As a result the original is conveyed in the reverse direction along roller 119 and guide plates 134 and 135 into the final transport path, from which it is passed in its original orientation to the top of the stack in the holder 101.

In the illustrated embodiments of the invention the originals do not need to be fed one by one entirely through the apparatus. After one side of an original has passed by the illumination station, another original can be transported toward the illumination while in the meantime the first one is being reversed.

With the apparatus of the invention it is also simple to copy a single side of an original a number of times by conveying the original a number of times through the continuous path. Thus, for this purpose, the original does not need to be conveyed to the illumination station on each occasion via the stack holder. This is important particularly for copying machines in which moving originals are exposed by slit illumination systems.

In copying machines in which original is stationary when illuminated it is not necessary to have such a continuous path for the repeated copying of a single original, because in such machines the original can be kept still until it has been illuminated a number of times by either a moving slit illumination system or an integral illumination system. Even so, the present invention can be used to advantage in such machine by employing an alternative embodiment of the apparatus shown in FIG. 3, in which the switches 140 and 141 and the guide plates 117 and 118 are omitted. The route taken for double-sided copying is then the same as that in the apparatus of FIG. 3. During the single-sided copying in this case, in order to place each copied original back in its original orientation on the stack in the holder 101, the original is transported from the final transport path via a branch from that path which extends in a loop over the holder 101 so that the original will enter the top of the holder from the side thereof opposite to the side from which originals are fed for illumination.

I claim:

1. Apparatus for feeding sheetlike originals for copying in a copying machine having an illumination station for exposing one side of one original at a time, said station having inlet and exit sides, comprising:
   a holder for a stack of the originals,
   means including a first transport path extending from the bottom of said holder to and through the illumination station for removing the lowermost original from the holder and conveying it to said station in position for copying its side that faced downward in the holder,
   a return path section having an outlet merging into said first transport path and directed toward the inlet side of said station at a location between said holder and said inlet side,
   reversing means including a reversing path for receiving an original fed from the exit side of said station and delivering the original in inverted position, and including a connecting path section spaced away from said first transport path for guiding an original delivered from said reversing path to the entrance of said return path section for return of the original to said station via said inlet side in position for copying the other side of the original,
   a final transport path for placing each copied original back into said holder at the top thereof, and
   means including at least a part of said reversing path for transporting an original from said exit side to said final transport path with the original disposed so that it will be in its original orientation when placed into the holder from the final transport path.

2. Apparatus according to claim 1, further comprising a path section for by-passing said reversing means and forming with said connecting path section, said return path section and a part of said first transport path a continuous path for repeatedly transporting an original to and from the illumination station with a same side of the original positioned for copying.

3. Apparatus according to claim 1 or 2, said first transport path and said final transport path being substantially straight and substantially parallel to each other.

4. Apparatus according to claim 1 or 2, said reversing means including a forked reversing path having first and second legs and a stem common to said legs, means for guiding into said stem via said first leg an original fed from the exit side of said station and means for guiding into said second leg an original moved in reversed direction from said stem; said connecting path section extending from said second leg to the entrance of said return path section.

5. Apparatus according to claim 4, said final transport path being an extension from said connecting path section and being connectible therewith at said entrance.

6. Apparatus according to claim 4, said first leg of said forked path being a substantially straight extension from said first transport path.

7. Apparatus according to claim 1 or 2, said final transport path being a substantially straight extension from said connecting path section and being connectible therewith at the entrance of said return path section.

8. Apparatus according to claim 4, said final transport path being an extension from said stem of said forked path.

9. Apparatus according to claim 2,
said reversing means including a forked reversing path having first and second legs and a stem common to said legs, means for guiding into said stem via said first leg an original fed from the exit side of said station and means for guiding into said second leg an original moved in reversed direction from said stem;
said by-passing path section bridging said legs, and said connecting path section extending from said second leg to the entrance of said return path section;
said final transport path being an extension from said stem of said forked path;
said by-passing path section, said connecting path section and said second leg constituting a delivery path for conveying an original fed from said exit side into said connecting path section and thence in reversed direction via said second leg into said stem for return to said holder via said final transport path.

10. Apparatus according to claim 9, comprising as part of both said forked path and said delivery path a reversible transport roller the surface of which at the top borders the junction of said legs and said stem, at the bottom borders said connecting path section, and about one side forms a wall of said second leg.

11. Apparatus according to claim 9 or 10, comprising a transport roller the surface of which at the top borders an end portion of said connecting path section, at the bottom borders said first transport path, and about one side forms a wall of said return path section.

12. A method of transporting originals in sequence from a stack of originals to the illumination station of a copying machine, which comprises taking the originals one by one from the bottom of the stack, initially transporting each original so taken past the illumination station in position for copying the side of the original that faced downward in the stack, then inverting the original by passing it through a reversing path and transporting it again past the illumination station in position for copying the other side of the original, and then transporting the original back to the stack via at least part of said reversing path and placing the original in its original orientation on top of the stack.

* * * * *